United States Patent
Ghedin et al.

(10) Patent No.: US 11,153,948 B2
(45) Date of Patent: Oct. 19, 2021

(54) MODULAR FRONT LIGHT LED DRIVER MESSAGING SYSTEM

(71) Applicant: Infineon Technologies AG, Neubiberg (DE)

(72) Inventors: Davide Ghedin, Fiesso D'artico (IT); Maurizio Galvano, Padua (IT); Stefan Stoegner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/806,618

(22) Filed: Mar. 2, 2020

(65) Prior Publication Data

US 2021/0274615 A1   Sep. 2, 2021

(51) Int. Cl.
*H05B 45/37* (2020.01)
*H05B 47/175* (2020.01)
*H05B 45/44* (2020.01)
*H05B 45/14* (2020.01)

(52) U.S. Cl.
CPC ............ *H05B 45/37* (2020.01); *H05B 45/14* (2020.01); *H05B 45/44* (2020.01); *H05B 47/175* (2020.01)

(58) Field of Classification Search
CPC ...... H05B 45/37; H05B 45/44; H05B 47/175; H05B 45/14
USPC .................................................... 315/185 R
See application file for complete search history.

(56) References Cited

U.S. PATENT DOCUMENTS

| | | | |
|---|---|---|---|
| 7,126,291 B2 * | 10/2006 | Kruse | H05B 47/19 |
| | | | 315/316 |
| 2003/0067220 A1 * | 4/2003 | Cros | B60Q 11/00 |
| | | | 307/9.1 |
| 2005/0289428 A1 * | 12/2005 | Ong | G01R 31/31905 |
| | | | 714/742 |
| 2007/0109807 A1 * | 5/2007 | Lynam | G06K 9/00838 |
| | | | 362/545 |
| 2009/0026958 A1 * | 1/2009 | Kitagawa | B60Q 1/1423 |
| | | | 315/77 |

(Continued)

OTHER PUBLICATIONS

Infineon Technologies, "ASCLIN_UART_1," AURIX TC2xx Microcontroller Training, V1.0.0, Edition Oct. 17, 2019, 12 pp.

(Continued)

*Primary Examiner* — Don P Le
(74) *Attorney, Agent, or Firm* — Shumaker & Sieffert, P.A.

(57) ABSTRACT

This disclosure describes techniques to control LED lighting systems using a circuit that includes communication, control and LED driver circuitry specific to a limited number of particular lighting functions. The circuit may communicate via a standard communication bus protocol and include feedback, protection and sensing circuitry to monitor the lighting functions and LED performance. The circuit may be small enough to be included as part of a lighting assembly, such as a vehicle headlight assembly. The included feedback and monitoring circuitry that may be physically close the driven LEDs may simplify the wiring when compared to other techniques. A configuration process for the circuit may further simplify the wiring connections, as well as reduce the development and manufacturing costs for lighting systems that may use the circuit. Limiting the lighting functions of each circuit may improve thermal management by distributing the thermal load.

23 Claims, 5 Drawing Sheets

(56) References Cited

U.S. PATENT DOCUMENTS

| | | | | |
|---|---|---|---|---|
| 2011/0121744 | A1* | 5/2011 | Salvestrini | H02M 1/082 |
| | | | | 315/246 |
| 2014/0086590 | A1* | 3/2014 | Ganick | G06Q 30/02 |
| | | | | 398/118 |
| 2015/0130359 | A1* | 5/2015 | Bosua | H05B 47/175 |
| | | | | 315/160 |
| 2016/0101725 | A1* | 4/2016 | Oh | B60K 37/02 |
| | | | | 315/77 |
| 2016/0316535 | A1* | 10/2016 | Reh | H05B 45/00 |
| 2016/0374168 | A1* | 12/2016 | Ackmann | H05B 45/37 |
| 2018/0027631 | A1* | 1/2018 | Turvy, Jr. | H05B 47/105 |
| | | | | 315/307 |
| 2020/0184032 | A1* | 6/2020 | Huang | G06F 30/327 |

OTHER PUBLICATIONS

CSS Electronics, "Can Bus Explained—A Simple Intro (2019)," video retrieved from https://www.csselectronics.com/screen/page/simple-intro-to-can-bus/language/en on or about Feb. 19, 2020, 1 pp.

GeeksforGeeks, "Difference between Bit Rate and Baud Rate," published by user MKS075 retrieved from https://www.geeksforgeeks.org/difference-btween-bit-rate-and-baud-rate/ on or about Feb. 19, 2020, 3 pp.

\* cited by examiner

MODULAR FRONT LIGHT LED DRIVER MESSAGING SYSTEM

TECHNICAL FIELD

The disclosure relates to light emitting diode (LED) lighting systems.

BACKGROUND

Modern vehicle systems may use smart LED solutions to replace bulbs and high intensity discharge (HID) lamps for front, interior and rear lighting. In addition, many industrial LED applications like architectural LED lighting, LED stripes or even emergency lighting, such as exit way signs may benefit from cost optimized systems to control and power such LED lighting.

SUMMARY

In general, the disclosure to techniques to control LED lighting systems using a circuit that includes communication circuitry, control circuitry, and LED driver circuitry specific to a limited number of particular lighting functions. The circuit may communicate via a two-wire communication bus protocol and the circuit may include feedback and sensing circuitry to monitor the lighting functions and LED performance. The satellite circuit may be small enough to be included as part of a lighting assembly, such as a vehicle headlight assembly. In this disclosure, a "satellite driver circuit" may refer to a driver circuit that is used for a subset or portion of available lighting functions. The included feedback and sensing circuitry that may be physically close the driven LEDs may simplify the wiring when compared to other techniques. The communication protocol and a configuration process for the satellite circuit may further simplify the wiring connections, as well as reduce the development and manufacturing costs for lighting systems that may use the satellite circuit. Limiting the lighting functions of each satellite circuit may improve thermal management by distributing the thermal load.

In one example, the disclosure is describes a circuit configured to: control a set of light emitting diodes (LEDs) to perform a specified lighting function, the circuit comprising: communication circuitry configured to receive and interpret a message from a bus controller, a configuration memory, and an LED driver circuit, configured to drive the set of LEDs to perform the specified lighting function, wherein the circuit operates the LED driver circuit to perform the specified lighting function based on: whether the message includes an identifier for the specified lighting function of the circuit, and information stored in the configuration memory.

In another example, the disclosure describes a system comprising: a bus controller, a set of light emitting diodes (LEDs), a circuit configured to communicate with the bus controller and drive the set of LEDs to perform a lighting function, the circuit comprising: a configuration memory, and an LED driver circuit, configured to drive the set of LEDs to perform the lighting function, wherein the circuit operates the LED driver circuit to perform the lighting function based on: whether a message received from the bus controller includes an identifier for the lighting function of the circuit, and information stored in the configuration memory.

In another example, the disclosure describes a method comprising: receiving, by a circuit, a message from a bus controller via a communication bus, determining, by the circuit, whether the message includes a function identifier for a function performed by the circuit, in response to determining that the message includes a function identifier for a function performed by the circuit, driving a set of LEDs based on: instructions included in the message from the bus controller, and a configuration of the circuit stored at a configuration memory of the circuit.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
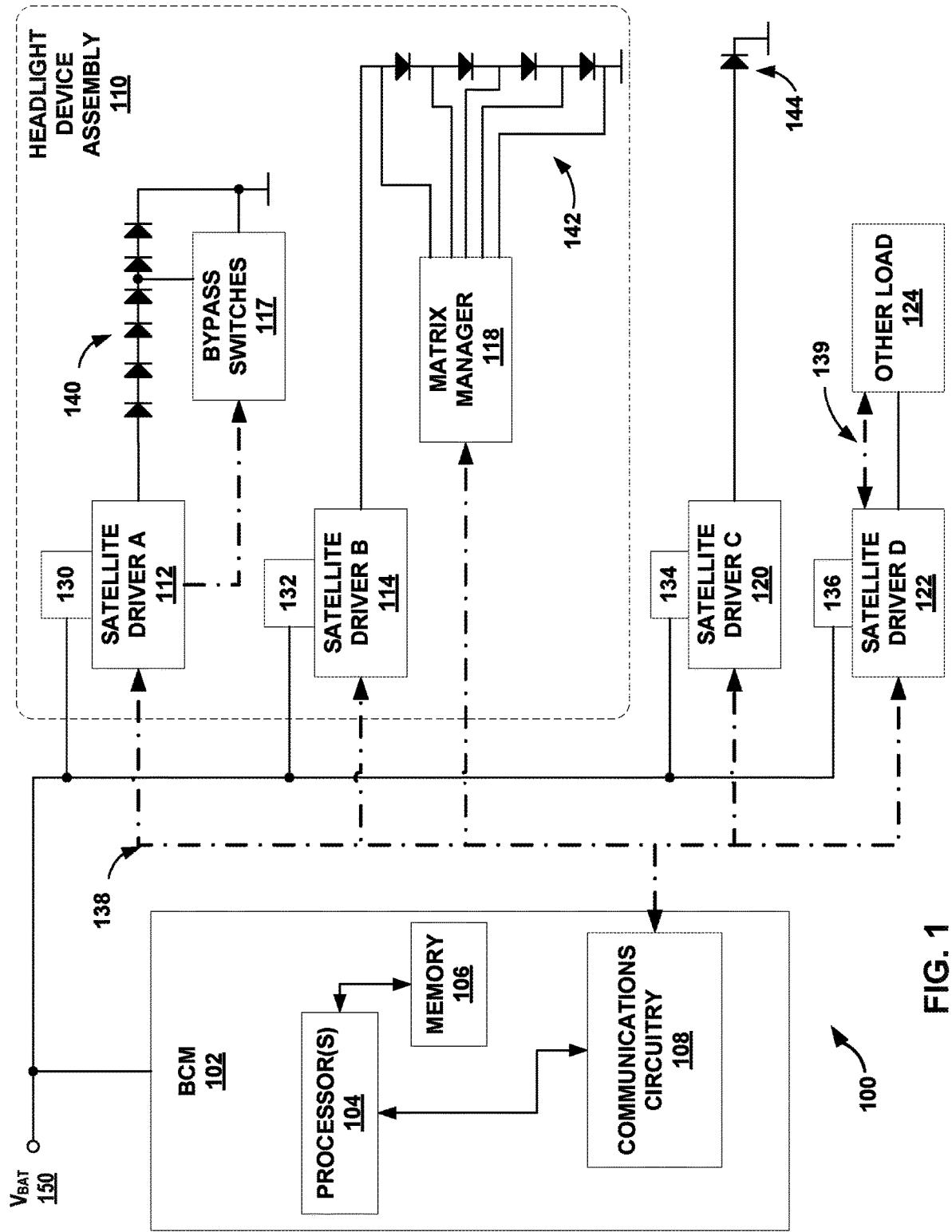
FIG. 1 is a block diagram illustrating an example LED lighting system including a vehicle headlight device assembly with satellite circuits according to one or more techniques of this disclosure.

FIG. 1 is a block diagram illustrating an example LED lighting system including a vehicle headlight device assembly with satellite circuits according to one or more techniques of this disclosure. The configuration of system 100 may eliminate an intermediate controller as well as complex and expensive connections between the intermediate controller and the headlight assembly that may be used with other types of headlight assemblies. System 100 may also control other loads and other LED lighting in additional to controlling and driving a vehicle headlight assembly. The description of this disclosure will focus on vehicle lighting, but the techniques of this disclosure may also apply to other power supply applications including lighting for buildings, outdoor lighting, safety lighting, and non-lighting applications including motor drives, and so on.

The example of system 100 depicted in FIG. 1 includes a body control module BCM 102, headlight device assembly 110 (called headlight 110 for short) as well as other satellite drivers for loads other than headlight 110. System 100 may be installed on a vehicle, such as an automobile or similar vehicle, to control and drive various lighting and other functions. Some examples of vehicle lighting functions that may be performed by headlight 110 may include a high beam function, a low beam function, a daytime running light (DRL) function; a turn indicator function, a cornering light function, a fog lamp function, position or running light function, a dynamic bending light function, control of a pixel light and matrix light and similar functions.

Headlight 110 may include one or more satellite driver circuits, switches and sets of LEDs to provide the vehicle lighting functions. The example of headlight 110 includes satellite driver circuit A 112 (called circuit A 112) configured to operate LED string 140. Headlight 110 also includes circuit B 114 that provides power to LEDs 142. LEDs 142 may include one or more LEDs controlled by matrix manager 118. In other examples, headlight 110 may include more or fewer satellite driver circuits and sets of LEDs. Vbat 150 may provide power to the components of system 100. Vbat 150 may be implemented as a battery or some other power supply.

As noted above, in this disclosure, a "satellite driver circuit" may refer to a driver circuit that is used for a subset or portion of available lighting functions. As with satellite driver circuits A 112, C 120 and D 122, circuit B 114 may be configured to control a set of light emitting diodes (LEDs) to perform a specified lighting function or some combination of lighting functions. For example, circuit B 114 may control and drive the turn signal function. In other examples, circuit B may control a combination of turn signal and daytime running light, or some other combination of functions.

Circuit B 114 may include communication circuitry configured to receive and interpret messages from a bus controller, such as BCM 102. Circuit B 114 may also include a configuration memory and an LED driver circuit configured to drive the set of LEDs 142 to perform the specified lighting function or functions. Some examples of LED driver circuits may include DC-DC converter circuits such as boost, buck, buck-boost and other types of driver circuits.

The configuration memory of circuit B 114 (not shown in FIG. 1) may store information that customizes circuit B 114 for the arrangement of headlight 110. For example, circuit B 114 may be a satellite driver circuit configured to control a turn signal function. Headlight 110 may include one or more LEDs and LED strings used for the turn signal function. In other examples, different headlight assembly may provide a turn signal function using a different set of LEDs with different power requirements, different duty cycle preferences and so on that differ from the arrangement of headlight 110. The configuration memory of circuit B 114 may customize circuit B 114 to operate the turn signal function for any compatible headlight device assembly.

In operation, circuit B 114 may operate the LED driver circuit (not shown in FIG. 1) to perform the specified lighting function based on whether a message from BCM 102 includes an identifier for the specified lighting function or functions performed by circuit B 114 and information stored in the configuration memory.

In the example of headlight 110, circuit B 114 provides power to matrix manager 118 to drive LEDs 142. Matrix manager 118 receives control commands from BCM 102 via communication bus 138. In some examples, circuit B 114 may provide power to LEDS 142 to provide a first lighting function at a first time and a second lighting function at a second time, based on messages from BCM 102. For example, circuit B 114 may provide power for a daytime running light function at the same time BCM 102 configures matrix manager 118 to control a subset of LEDs of LEDs 142 that perform the daytime running light function. The power supplied by circuit B 114 may be set to a specified voltage, current, duty cycle and so on as specified by BCM 102 and the configuration memory of circuit B 114. In some examples BCM 102 may send messages to circuit B 114 that include only a lighting function activation flag and an LED brightness level. The specific details of duty cycle, and other settings may be determined by circuit B 114 based on the lighting function and configuration memory.

At a second time, BCM 102 may send messages to circuit B 114 and matrix manager 118 to perform a different function, such as a turn signal, fog lamp, and so on. In some examples, the combination of matrix manager 118 and circuit B 114 may operate a dynamic turn signal indicator, such as a wiping or ripple effect turn signal.

In some examples, BCM 102 may communicate only with circuit B 114 and not directly with matrix manager 118. In some examples circuit B 114 may include a second communication connection to matrix manager 118 (not shown in FIG. 1), similar to communication link 139 described for circuit D 122. In other words, circuit B 114 may interpret messages from BCM 102 and communicate with matrix manager 118 to perform the one or more lighting functions.

Circuit B 114 may receive power from Vbat 150. In some examples, Circuit B 114 may receive power from Vbat 150 via a switch 132. Switch 132 may be any type of switch, such as a metal oxide semiconductor field effect transistor (MOSFET) and may be used as protection, or to otherwise regulate power to circuit B 114. In some examples, circuit B 114 may also include feedback functionality that may determine the operating status of one or more of LEDs 142.

As with circuit B 114, circuit A 112, circuit C 120, and circuit D 122 may include communication circuitry configured to receive and interpret messages from a bus controller, such as BCM 102. C circuit A 112, circuit C 120, and circuit D 122 may also include a configuration memory and an LED driver circuit, configured to drive the set of LEDs to perform the specified lighting function or functions. In some examples, each satellite driver circuit may be configured to perform a lighting function different from the other satellite driver circuits. For example, circuit A 112 may be configured for a high beam function. Circuit A 112 may receive power from Vbat 150. In some examples, circuit A 112 may receive power via switch 130, which is similar to switch 132 described above.

In some examples, headlight 110 may also include bypass switches 117. Bypass switches may be configured to disable one or more portions of LED string 140 to perform a specific function. As one possible example, bypass switches 117 may be controlled by satellite driver A 112 to inactivate a portion of LEDs 140 for a low-beam function and to activate all of LEDs 140 for a high-beam function. In other examples, bypass switches 117 may receive messages directly from BCM 102 (not shown in FIG. 1). Bypass switches 117 may also be referred to as a switch network in this disclosure.

Circuit C 120 may control lighting separate from headlight 110. For example, a fog light, reverse light or brake lights may be separate from a headlight assembly. Circuit C 120 may receive power from Vbat 150, and in some examples, via switch 134. Circuit C 120 may the circuit operates the LED driver circuit within circuit C 120 to perform the specified lighting function based on a message from BCM 102 that includes an identifier for the specified lighting function of the circuit and information stored in the configuration memory. As with circuit A 112, circuit B 114, and circuit D 122, a vehicle manufacturer, or light assembly manufacturer, may program the configuration memory of circuit C 120 based on, for example, the type of LEDs in LED set 144, the voltage and other characteristics of Vbat 150, a balance between desired light output and energy savings, and so on. In the example of FIG. 1, LED set 144 is a single LED, but in other examples may include two or more LEDs.

A satellite driver circuit of this disclosure may also be configured to drive loads other than for a lighting function. For example, circuit D 122 may be configured to drive various other loads 124. Other load 124 may include any of an audible alarm, a display, a motor, such as to drive a cooling fan to dissipate heat for thermal management of one or more components of system 100, voltage supply for a LED driver second stage linear current regulator or DC-DC led driver and so on. Though depicted as separate from headlight device assembly 110, in other examples other loads 124 may be included as part of headlight device assembly 110, for example a cooling fan configured to manage the temperature of circuits A 112 and B 114 such as when the vehicle is not moving.

As described above, circuit D 122 may receive power from Vbat 150 via switch 136 and provide power to other load 124 based on a message from BCM 102 and a predefined configuration stored at a configuration memory of circuit D 122. In some examples a satellite driver circuit such as circuit D 122 may include a connections to communicate with other loads 124, e.g. via communication link 139.

In the example in which other load 124 is a motor, circuit D 122 may be implemented with a drive circuit such as an H-bridge. In other words, when selecting a satellite driver circuit to drive a motor, a system designer may select a satellite driver with a DC-DC driver circuit configured to efficiently drive a motor, such as a DC-DC driver that includes an H-bridge controller and one or more bypass switches, rather than, for example a buck-boost type driver. In this manner the techniques of this disclosure include a variety of satellite driver circuits to provide a modular approach to system design of the vehicle lighting system depicted by system 100.

In the example of FIG. 1, BCM 102 is configured as a body control module. However, in other examples, BCM 102 may be any type of control unit, e.g. an electronic control unit, that may operate as a bus controller to control one or more functions of, for example, a vehicle. BCM 102 may include one or more processors 104 operatively coupled to one or more memory devices 106. In the example of FIG. 1, BCM 102 also includes communication circuitry 108. BCM 102 may monitor and control various aspects of a vehicle's operation. Some examples may include monitoring sensors that indicate whether a door is closed, tire pressure, operating indicator lights, and communicating with secondary processors such as an electronic control unit (ECU). BCM 102 may function in a master/slave configuration with the satellite driver circuits of system 100, in which computation may be split between BCM and LED driver.

Examples of a processor of processors 104 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Communications circuitry 108 may be configured to communicate with the satellite driver circuits via communication bus 138. In some examples, communication circuitry 108 may include a Universal Asynchronous Receiver/Transmitter (UART). In some examples, communication circuitry 108 may operate using any one or more of a gigabit multimedia serial link (GMSL) interface; a controller area network (CAN) bus interface, UARToverCAN (Universal Asynchronous Receiver/Transmitter), a controller area network-flexible data (CAN-FD) bus interface; an interface defined according to a FlexRay protocol; a link defined according to a low voltage differential signaling (LVDS) standard, such as FPD-Link, FlatLink, FPD-Link II, FPD-Link III, and OpenLDI, or a controller area network-extra-large (CAN-XL) bus interface. In the example of system 100, communication bus 138 may be a two-wire bus operating using CAN-FD or similar two-wire protocol.

System 100 may control the lighting functions of vehicle based on vehicle operator input, sensor input, and other factors. For example, a vehicle operator may operate a control to signal a left turn. BCM 102 may command a turn signal driver circuit, e.g. circuit B 114 to turn off the daytime running lights. BCM 102 may further command circuit B 114 and matrix manager 118 to activate a wiping turn signal. BCM 102 may further command circuit C 120 to activate a cornering light at a specified brightness level, based on a sensed level of ambient light around the vehicle. For each change, BCM 102 may send messages via communication bus 138 that include a lighting function indicator. The slave satellite driver circuit may react to messages that include a lighting function indicator for which the satellite driver circuit operates. In other words, circuit B 114 may ignore the message on communication bus 138 with the cornering function indicator but react to messages that include a turn signal function indicator.

In other examples, BCM 102 may send a message where the brightness level for all the functions may be updated with a common identifier. For example, a vehicle may enter a tunnel during the day. One or more sensors connected to BCM 102, such as a light level sensor and a camera, may signal BCM 102 that the vehicle has entered the tunnel. BCM 102 may send a message with the common identifier such that all the satellite driver circuits react to the message and increase brightness to a specified level. In other examples, BCM 102 may output a message with a common identifier for a subgroup of lighting functions to cause all lighting functions of the subgroup to react to the message.

System 100 may have several advantages when compared with other types of systems for controlling lighting functions and other loads. The satellite driver circuits of system 100 divide the various lighting functions among a variety of modular, selectable driver circuits. A satellite driver circuit may provide a scalable solution for vehicle lighting, as well as controlling other loads. In contrast to an intermediate electronic control unit that controls and drives all the lighting functions, the separate plug and play satellite driver circuits, each specific to particular function or functions and each with an LED driver may simplify reduce costs for a lighting device assembly, such as headlight 110. Though each satellite driver circuit may be programmable to be configured for specific details, such a driver circuit may not require development, testing and validation of dedicated software to control all the aspects of all the lighting functions for a vehicle. Each headlight device assembly and changes to the headlight device assembly may require different dedicated software, along with the associated development and validation costs. In some examples the dedicated software may need to be validated to the AUTOSAR (AUTomotive Open System ARchitecture) standard, which may add additional cost.

In addition, a module for a satellite driver circuit that may not be specific to a particular headlight device assembly may be used across other vehicles and lighting designs. The driver circuits may be built with high volumes and standard design, which may reduce cost, improve reliability and improve logistics for aftermarket replacement parts. For example, satellite driver circuits according to one or more techniques of this disclosure may be implemented as several different models. A first model for operating a turn signal function, a second model for operating a high beam function, a third model for operating a low beam function, a fourth model for operating both high beam and low beam functions, and so on. A system designer may select which models of driver circuits may be appropriate, configure each driver circuit for the particulars of the lighting design and implement a modular design with reduced need for extensive software development and testing. In some examples a headlight device assembly designer may install and configure the satellite driver circuits before sending the headlight device assembly to a vehicle assembly operation for final installation and configuration. In other words, the techniques of this disclosure may provide a selection of different satellite driver circuits to allow for a modular design to drive a variety of different loads, with the modules selected based on the desired design goals.

Another advantage of a satellite driver circuit may include reducing the size, cost and complexity of the interconnections between a single electronic control unit and a headlight device assembly. The interconnections for an intermediate, dedicated electronic control unit that combines all lighting, driver, and thermal management functions may include an output line from each driver circuit to each LED or LED string in the headlight device assembly, sensor lines to monitor LED performance, and so on. The LED output lines may be sized to carry the required current over the distance between the dedicated electronic control unit and one or more headlight device assemblies.

In contrast, the satellite driver circuits according to this disclosure may be mounted close to the set of LEDs to be driven by a particular satellite driver circuit. Connections carrying power to the set of LEDs may be short and feedback between the LED driver circuit and communication circuitry may be built into each satellite driver circuit. Each satellite driver circuit may connect to a power bus supplied by Vbat 150 and communication bus 138. The simplified connection arrangement of this disclosure may reduce costs, reduce hardware development effort and improve reliability when compared to other techniques.

Other advantages may include simplifying thermal management and reducing the cost of heat dissipation structures that may be used by a single, intermediate controller. For example, each satellite driver circuit may be installed in different locations in the headlight device assembly, which may spread out heat generated by the LED driver circuits within the satellite driver circuits.

Figure 2:
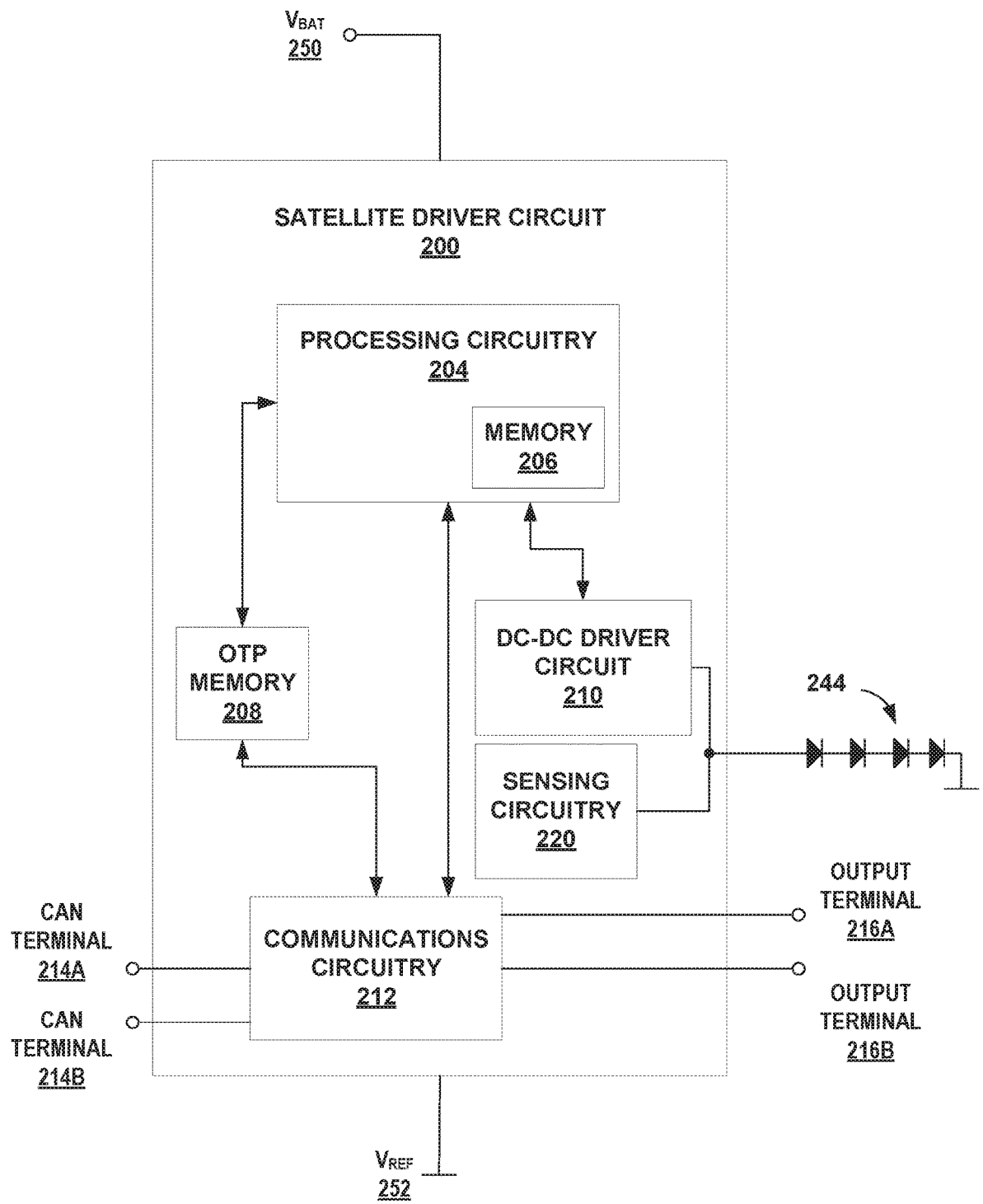
FIG. 2 is a block diagram illustrating details of a satellite LED driver circuit according to one or more techniques of this disclosure.

FIG. 2 is a block diagram illustrating details of a satellite LED driver circuit according to one or more techniques of this disclosure. Satellite driver circuit 200 (called circuit 200 for short), is an example of circuit A 112, circuit B 114, circuit C 120, and circuit D 122 described above in relation to FIG. 1 and may have similar functions and characteristics. For example, circuit 200 may be configured to control a set LEDs to perform a specified lighting function or some combination of lighting functions, or provide power to another load, such as a motor.

In the example of FIG. 2, circuit 200 includes processing circuitry 204, DC-DC driver circuit 210, sensing circuitry 220 and communications circuitry 212. Circuit 200 may receive power from Vbat 250 and also connect to a reference voltage Vref 252.

In the example of circuit 200 the configuration memory is one-time programmable (OTP) memory 208. In other examples, the configuration memory may be re-programmable and implemented by, for example EPROM or some other re-programmable memory device. OTP memory 208 may store configuration information, such as the number and type of LEDs in LED string 244. In some examples, configuration information may also include predetermined settings for a selected brightness level, such as pulse width modulation information including PWM frequency, PWM duty cycle, as well as voltage and current settings for the selected brightness level. Other configuration information may include a lighting function identifier value, an LED power derating profile, other specific information for the vehicle or assembly that circuit 200 may be installed as well as device specific configurations particular to circuit 200, such as general purpose input/output (GPIO), safe state settings and so on.

In some examples, circuit 200 may include one or more protection functions. Some examples of protection functions may include reverse polarity, LED short circuit, LED open load, LED power derating and thermal shut down among others. Sensing circuitry 220 may include one or more sensors, such as a temperature sensor, to detect fault or malfunction conditions within circuit 200 and with LED string 244. The configuration memory, i.e. OTP memory 208 in the example of FIG. 2, may include threshold limits, operation ranges and other settings to customize the protection features to a particular application.

In some examples, OTP memory 208 may receive configuration information from CAN terminal 214A and 214B via communication circuitry 212. Though depicted as CAN terminals in the example of FIG. 2, communication circuitry may work with any of various communication protocols, such as those described above in relation to FIG. 1.

Communication circuitry 212 may also be operatively coupled to processing circuitry 204. As described above in relation to FIG. 1, communication circuitry 212 may receive a message from a bus controller such as BCM 102. In some examples, communication circuitry 212 may interpret the message from BCM 102 and determine that the message is directed to a lighting function that is not managed by circuit 200. Communication circuitry 212 and processing circuitry 204 may take no further action with the message.

In other examples, communication circuitry may interpret a message received from BCM 102 and determine that the message is directed to a lighting function managed by circuit 200. The message may include, for example, an activation flag indicating whether to turn on or turn off the lighting function. The message may also include an indication of a brightness level for the LEDs of LED string 244. Processing circuitry 204 is operatively coupled to OTP memory 208, communication circuitry 212, and the LED driver circuit, i.e. DC-DC driver circuit 210. Processing circuitry 204 may control DC-DC driver circuit 210 based on the message received by communication circuitry 212 and information stored at OTP memory 208. For example, processing circuitry 204 may select a PWM frequency and duty cycle for the brightness level requested by BCM 102. Processing circuitry 204 may cause DC-DC driver circuit 210 to provide a predetermined magnitude of current at the selected PWM frequency and duty cycle based on the number and type of LEDs in LED string 244 as well as other settings stored at OTP memory 208. As described above in relation to FIG. 1, DC-DC driver circuit 210 may be implemented as a variety of driver circuits, e.g. a buck converter, a boost converter or some other type of driver. In some examples the type of DC-DC driver 210 may depend on the expected operating environment, input voltage, type of load expected and other factors.

Similar to circuit A 112 described above in relation to FIG. 1, circuit 200 may include communication output terminals 216A and 216B. Circuit 200 may use output communication terminals to control or otherwise communicate with other components in a lighting device assembly. For example, output terminals 216A and 216B may connect to a component via communication link such as with other loads 124 or matrix manager 118 described above in relation to FIG. 1. In other words, output terminals 216A and 216B may be configured to control one or more switches, such that circuit 200 may drive a set of LEDs via the one or more switches to perform the specified lighting function. In some examples, output terminals 216A and 216B may also communicate with one or more downstream secondary power supplies driven by DC-DC driver circuit 210. In some examples, communication circuitry 212 may receive messages from BCM 102 via CAN terminals 214A and 214B, which may pass through circuit 200 to another component. In other examples, communication circuitry 212 of circuit 200 may generate signals to control the operation of the downstream component connected to output terminals 216A and 216B.

Similar to processors 104 described above in relation to FIG. 1, processing circuitry 204 may be implemented as any logic circuit, hardware, software or combination, including a microcontroller. However, in contrast to the intermediate electronic control unit technique, the operation of processing circuitry 204 may be considered as a black box to a system designer. A system designer using circuit 200 to implement one of the lighting functions described above in relation to FIG. 1 need only provide configuration information to be stored at OTP memory 208 to customize circuit 200 to control LED string 244. Providing configuration information may have the advantage of reducing development time and costs when compared to coding and testing of custom software to be executed on, for example, a general purpose microcontroller.

Figure 3:
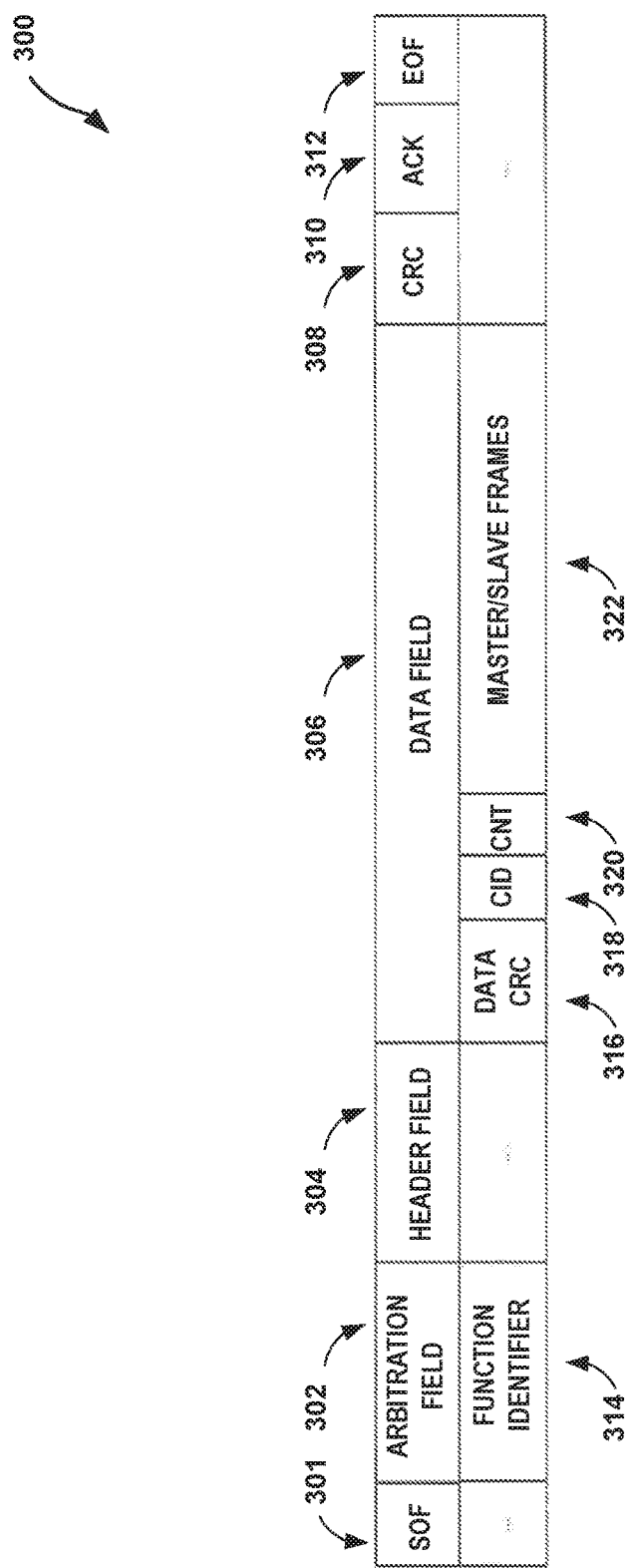
FIG. 3 is a conceptual diagram illustrating an example message for use with a system according to one or more techniques of this disclosure.

FIG. 3 is a conceptual diagram illustrating an example message for use with a system according to one or more techniques of this disclosure. Message frame 300 is one possible example of a message format that may be sent on communication bus 138 between BCM 102 and the satellite driver circuits, and other components of system 100, described above in relation to FIG. 1. Message frame 300 may have a similar structure to a CAN or CAN-FD message frame structure.

Message frame 300, also called a packet, may include a start of frame (SOF) 301, an arbitration field 302, header field 304, a data field 306, a validation field, which in the example of FIG. 3 is a cyclic redundancy check (CRC) field 308, an acknowledgement field 310 and end of frame (EOF) delimiter 312.

Arbitration field 302 may include function identifier 314. As described above in relation to FIGS. 1 and 2, the function identifier may cause communication circuitry of a satellite driver circuit to ignore or react to a message. In some examples, the messaging system of this disclosure may address directly each light function individually. For example, BCM 102 depicted in FIG. 1 may output a message on the communication bus with the function identifier for the fog lamps. A satellite driver circuit that controls the high beam lighting function may ignore the message. But satellite driver circuits for the fog lamp function may react to the message, e.g., turn on, turn off, change lighting output shape, increase or decrease brightness, etc. In other examples function identifier 314 may be a general identifier that may apply to all or a subset of lighting functions. For example, a general identifier may cause all satellite driver circuits to increase or decrease brightness levels.

In the example of FIG. 3, data field 306 includes a data CRC 316, CID 318, a counter field CNT 320 and master/slave frames 322. CRC 316 may be a second CRC that communication circuitry of a satellite driver circuit may use to check the integrity of master/slave frames 322. Master/slave frames 322 may include master frames sent from the bus controller to the satellite driver circuits. As described above in relation to FIGS. 1 and 2, master frames may include an activation indicator or flag to turn on or off LEDs, a brightness level and other similar control signals. Master/slave frames 322 may also include slave frames sent from the satellite driver circuits to the bus controller, e.g., BCM 102. Slave frames may include information such as an acknowledgement that a recipient received a sent frame, status messages, alarm messages or flags such as if a satellite driver circuit detects an open LED, over temperature and so on.

CID 318 may be used as a check that the data applies to the correct function identifier 314. In some examples, CID 318 may include a portion of function identifier 314 and communication circuitry of the satellite driver circuit may compare CID 318 to function identifier 314 for verification.

CNT 320 may include a rolling counter maintained by the originator (e.g. BCM 102) of message frame 300, and the rolling counter in CNT 320 may be used to detect duplicated frames or to detect missed frame reception. CNT 320 may be incremented after any transmission of the data into the communication bus lines and may be set to zero after any reset of the device.

CRC 308 may be used as a validation check on the integrity of all of frame 300. ACK 310 may provide the bus controller confirmation that a sent message was received by at least one satellite driver circuit, or other component in the system, e.g. matrix manager 118 described above in relation to FIG. 1. In response to the bus controller receiving no acknowledgement for a sent frame by any recipient on the bus, e.g. via ACK 310 field, then the bus controller may retry the same frame using the same CNT 320 value.

Figure 4:
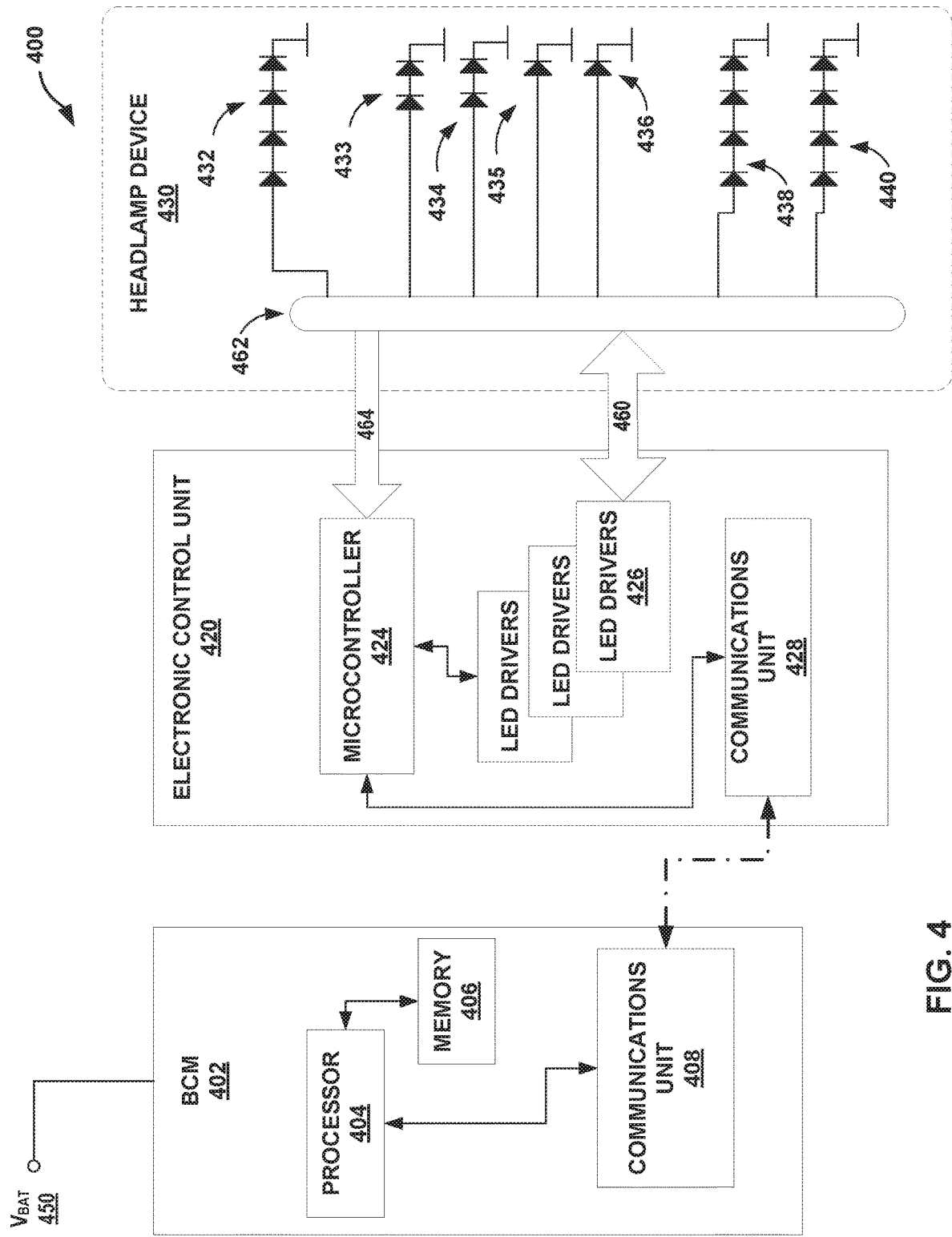
FIG. 4 is a block diagram illustrating an alternative example LED lighting system.

FIG. 4 is a block diagram illustrating an alternative example LED lighting system. Similar to system 100 described above in relation to FIG. 1, system 400 may also include a bus controller, BCM 402 and a headlight device assembly, headlight 430. But in contrast to system 100, the example of system 400 includes an intermediate electronic control unit, electronic control unit (ECU) 420.

BCM 402 may include one or more processors 404, memory 406 and communications unit 408. In the configuration of system 400, BCM 402 may send CAN or LIN commands to ECU 420 to control and retrieve the status of the LED lighting functions of headlight 430. Microcontroller 424 on ECU 424 may decode these commands and then control LED drivers 426 or other external components to execute what requested by BCM 402. In some examples communications unit 38 may be included as part of microcontroller 424. In other examples communications unit 428 may include circuitry, such as UART circuitry described above in relation to FIG. 1, controlled by microcontroller 424.

System 400 may have disadvantages, such as a need for a dedicated ECU to act as interpreter of the BCM commands. A dedicated ECU may also require development of OEM specific AUTOSAR compliant software, which adds an extra cost to development of both a headlight device assembly and to a final product, such as a vehicle. In contrast to the satellite driver circuits of this disclosure, the dedicated ECU may require new software development, testing, validation and certification for each different application and any changes to a particular vehicle, rather than a simple configuration update as used by the satellite driver circuits of this disclosure.

An additional disadvantage may include a big connector 460 to connect the LED drivers 426 to all the sets of LEDs inside headlight 430. In the example of FIG. 4, headlight 430 may include LEDs 435 and 436 as well as one or more LED strings 432, 433, 438 and 440. Connector 460 may also include sensor connections 464 from headlight 430 to microcontroller 424. As a result, a wire harness that includes all of connections 460 and 464 may be large and implemented at a consequent high cost for the wiring.

In some examples, concentrating all the LED drivers 426 in one location may require an expensive thermal management solution to dissipate the heat generated by LED drivers 426 and protect surrounding components of a vehicle or other product. For example, a dedicated metal housing may be used to manage the heat generated by LED drivers 426.

Figure 5:
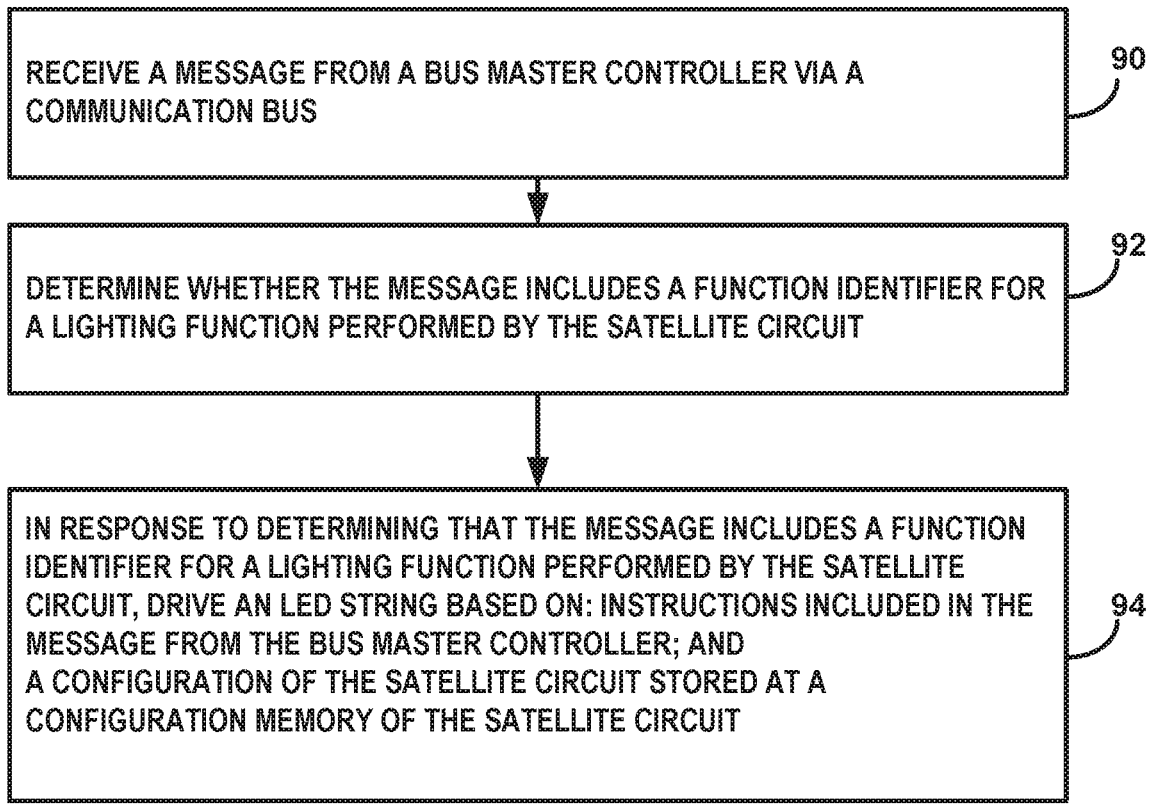
FIG. 5 is a flow chart illustrating an example operation of a lighting system according to one or more techniques of this disclosure.

FIG. 5 is a flow chart illustrating an example operation of a lighting system according to one or more techniques of this disclosure. The blocks of FIG. 5 will be described in terms of FIG. 1 unless otherwise noted.

A satellite driver circuit, e.g. circuit B 114, may receive a message from a bus controller, BCM 102, via communication bus 138 (90). Circuit B 114 may determine whether the message from BCM 102 includes a function identifier for a function performed by the circuit (92), e.g. a low beam function, a turn signal function, a motor drive function, supply power to a secondary DC-DC converter and so on.

If the function identifier issued by the master matches the slave identifier, the slave, e.g. circuit B 114 may take action according the master request frame. Otherwise circuit B 114 may ignore the entire frame. In other words, in response to determining that the message from BCM 102 includes a function identifier for a lighting function performed by circuit B 114, the circuit B 114 may drive a set of LEDs based on both instructions included in the message from the bus controller, BCM 102 as well as a configuration of circuit B 114 stored at a configuration memory of circuit B 114. For example, configuration information may correlate a specified brightness level in the master portion of a message frame, described above in relation to FIG. 3, to a predetermined PWM frequency, PWM duty cycle, current level and so on to be output to a set of LEDs.

In one or more examples, the functions described above may be implemented in hardware, software, firmware, or any combination thereof. For example, the one or more processors 104 and 404 described above in relation to FIGS. 1 and 4 may be implemented in hardware, software, firmware, or any combination thereof. If implemented in software, the functions may be stored on a tangible computer-readable storage medium such as memory 106, memory 206 and memory 406 described above in relation to FIGS. 1, 2 and 4 and executed by a processor or hardware-based processing unit.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described The techniques of this disclosure may also be described in the following examples.

Example 1. A circuit configured to: control a set of light emitting diodes (LEDs) to perform a specified lighting function, the circuit comprising: communication circuitry configured to receive and interpret a message from a bus controller, a configuration memory, and an LED driver circuit, configured to drive the set of LEDs to perform the specified lighting function, wherein the circuit operates the LED driver circuit to perform the specified lighting function based on: whether the message includes an identifier for the specified lighting function of the circuit, and information stored in the configuration memory.

Example 2. The circuit of example 1, wherein the message comprises a lighting function activation flag and an LED brightness level.

Example 3. The circuit of any combination of examples 1-2, wherein the circuit is configured to perform one or more of the following specified lighting functions based on the identifier in the message: a high beam function, a low beam function, a daytime running light (DRL) function; a turn indicator function; and a fog lamp function. based on the activation flag in the received message.

Example 4. The circuit of any combination of examples 1-3, wherein the circuit is configured to perform one and only one of the following functions at a given time: a high beam and a low beam function or a daytime running light (DRL) and turn indicator function.

Example 5. The circuit of any combination of examples 1-4, wherein the configuration memory is configured to store information that includes a quantity of LEDs in the set of LEDs and a type of LEDs in the set of LEDs.

Example 6. The circuit of any combination of examples 1-5, wherein the configuration memory is a one-time programmable (OTP) memory. the LED driver circuit comprises: a DC-DC driver circuit, and sensing circuitry configured to monitor performance of the set of LEDs.

Example 7. The circuit of any combination of examples 1-6, wherein the LED driver circuit comprises: a DC-DC driver circuit; and sensing circuitry configured to monitor performance of the set of LEDs.

Example 8. The circuit of any combination of examples 1-7, wherein the bus controller is configured to communicate according to a two-wire bus communication standard selected from one of: controller area network (CAN), controller area network-flexible data (CAN-FD), UARTover-CAN (Universal Asynchronous Receiver/Transmitter), or local interconnect network (LIN).

Example 9. The circuit of any combination of examples 1-8, further comprising communication output terminals configured to control one or more switches, wherein the circuit is configured to drive the set of LEDs via the one or more switches to perform the specified lighting function.

Example 10. The circuit of any combination of examples 1-9, further comprising communication output terminals configured to communicate with one or more secondary power supplies.

Example 11. The circuit of any combination of examples 1-10, further comprising processing circuitry operatively coupled to the configuration memory, the communication circuitry, and the LED driver circuit, wherein the processing circuitry is configured to control the LED driver circuit based on the message received by the communication circuitry and information stored at the configuration memory.

Example 12. A system comprising: a bus controller, a set of light emitting diodes (LEDs), a circuit configured to communicate with the bus controller and drive the set of LEDs to perform a lighting function, the circuit comprising: a configuration memory, and an LED driver circuit, configured to drive the set of LEDs to perform the lighting function, wherein the circuit operates the LED driver circuit to perform the lighting function based on: whether a message received from the bus controller includes an identifier for the lighting function of the circuit, and information stored in the configuration memory.

Example 13. The system of example 12, wherein the set of LEDs is a first set of LEDs and the circuit is a first circuit, the system further comprising a second set of LEDs and a second circuit, wherein the first circuit is configured to perform one or more of the following lighting functions: a high beam function, a low beam function, a daytime running light (DRL) function, a turn indicator function, and a fog lamp function, based on the identifier in the received message, and the second circuit is configured to perform one of the lighting functions different from the lighting function performed by the first circuit.

Example 14. The system of any combination of examples 12-13, wherein the bus controller is configured to synchronize and resynchronize the first circuit and the second circuit.

Example 15. The system of any combination of examples 12-14, wherein the circuit is configured to perform one and only one of the following functions a given time: a high beam and a low beam function or a daytime running light (DRL) and turn indicator function.

Example 16. The system of any combination of examples 12-15, wherein the configuration memory is a one-time programmable (OTP) memory and is configured to store information include a quantity of LEDs in the set of LEDs and type of LEDs in the set of LEDs.

Example 17. The system of any combination of examples 12-16, wherein the two-wire bus communication standard is selected from one of: controller area network (CAN), controller area network-flexible data (CAN-FD), UARTover-CAN (Universal Asynchronous Receiver/Transmitter), or local interconnect network (LIN).

Example 18. The system of any combination of examples 12-17, further comprising a switch network, wherein the circuit is configured to drive the set of LEDs via the switch network.

Example 19. The system of any combination of examples 12-18, wherein the switch network is a matrix manager.

Example 20. The system of any combination of examples 12-19, wherein the set of LEDs is configured to operate as a wiping turn indicator.

Example 21. The system of any combination of examples 12-20, wherein the circuit further comprises processing circuitry operatively coupled to the configuration memory and the LED driver circuit, wherein the processing circuitry is configured to control the LED driver circuit based on the message received from the master controller and information stored at the configuration memory.

Example 22. A method comprising: receiving, by a circuit, a message from a bus controller via a communication bus, determining, by the circuit, whether the message includes a function identifier for a function performed by the circuit, in response to determining that the message includes a function identifier for a function performed by the circuit, driving a set of LEDs based on: instructions included in the message from the bus controller, and a configuration of the circuit stored at a configuration memory of the circuit.

Example 23. The method of example 22, wherein the message comprises a lighting function activation flag and a LED brightness level.

Example 24. The method of any combination of examples 22-23, further comprising: receiving, by the circuit, a request for information from the bus controller, determining, by the circuit, a status of one or more LEDs of the set of LEDs, sending, by the circuit, a message to the bus controller a message including the status of the one or more LEDs.

Example 25. The method of any combination of examples 22-24, wherein the status comprises one or more of the following: whether the one or more LEDs are on or off; a brightness level of the one or more LEDs; whether the one or more LEDs have malfunctioned.

Various examples of the disclosure have been described. These and other examples are within the scope of the following claims.

What is claimed is:

1. A circuit configured to control a set of light emitting diodes (LEDs) to perform a specified lighting function, the circuit comprising:
   communication circuitry configured to receive and interpret a message from a bus controller, wherein the message comprises an identifier;
   a configuration memory; and
   an LED driver circuit, configured to drive the set of LEDs to perform the specified lighting function,
   processing circuitry configured to:
      determine whether the identifier in the received message matches the specified lighting function for the circuit; and
      in response to determining that the identifier in the received message matches the specified lighting function stored in the configuration memory, operate the LED driver circuit to perform the specified lighting function.

2. The circuit of claim 1, wherein the message comprises a lighting function activation flag and an LED brightness level.

3. The circuit of claim 1, wherein the specified lighting function stored at the configuration memory includes one of: a high beam function, a low beam function, a daytime running light (DRL) function; a turn indicator function; and a fog lamp function.

4. The circuit of claim 1, wherein the circuit is configured to perform one and only one of the following specified lighting functions at a given time: a high beam and a low beam function or a daytime running light (DRL) and turn indicator function.

5. The circuit of claim 1, wherein the configuration memory is configured to store information that includes a quantity of LEDs in the set of LEDs and a type of LEDs in the set of LEDs.

6. The circuit of claim 1, wherein the configuration memory is a one-time programmable (OTP) memory.

7. The circuit of claim 1, wherein the LED driver circuit comprises:
a DC-DC driver circuit; and
sensing circuitry configured to monitor performance of the set of LEDs.

8. The circuit of claim 1, wherein the bus controller is configured to communicate according to a two-wire bus communication standard selected from one of: controller area network (CAN), controller area network-flexible data (CAN-FD), UARToverCAN (Universal Asynchronous Receiver/Transmitter), or local interconnect network (LIN).

9. The circuit of claim 1, further comprising communication output terminals configured to control one or more switches, wherein the circuit is configured to drive the set of LEDs via the one or more switches to perform the specified lighting function.

10. The circuit of claim 1, further comprising communication output terminals configured to communicate with one or more secondary power supplies.

11. The circuit of claim 1, further comprising processing circuitry operatively coupled to the configuration memory, the communication circuitry, and the LED driver circuit, wherein the processing circuitry is configured to control the LED driver circuit based on the message received by the communication circuitry and information stored at the configuration memory.

12. A system comprising:
a bus controller;
a set of light emitting diodes (LEDs);
a circuit configured to communicate with the bus controller and drive the set of LEDs to perform a specified lighting function, the circuit comprising:
a configuration memory; and
an LED driver circuit, configured to drive the set of LEDs to perform the specified lighting function;
processing circuitry configured to:
determine whether the identifier in the received message matches the specified lighting function for the circuit;
in response to determining that the identifier in the received message matches the specified lighting function stored in the configuration memory, operate the LED driver circuit to perform the specified lighting function.

13. The system of claim 12, wherein the set of LEDs is a first set of LEDs and the circuit is a first circuit, the system further comprising a second set of LEDs and a second circuit,
wherein the first circuit is configured to perform one or more of the following lighting functions: a high beam function, a low beam function; a daytime running light (DRL) function; a turn indicator function; and a fog lamp function, based on the identifier in the received message, and
the second circuit is configured to perform one of the lighting functions different from the lighting function performed by the first circuit.

14. The system of claim 13, wherein the bus controller is configured to synchronize and resynchronize the first circuit and the second circuit.

15. The system of claim 12, wherein the circuit is configured to perform one and only one of the following functions a given time: a high beam and a low beam function or a daytime running light (DRL) and turn indicator function.

16. The system of claim 12, wherein the configuration memory is a one-time programmable (OTP) memory and is configured to store information include a quantity of LEDs in the set of LEDs and type of LEDs in the set of LEDs.

17. The system of claim 12, wherein the two-wire bus communication standard is selected from one of: controller area network (CAN), controller area network-flexible data (CAN-FD), UARToverCAN (Universal Asynchronous Receiver/Transmitter), or local interconnect network (LIN).

18. The system of claim 12, further comprising a switch network, wherein the circuit is configured to control a portion of the set of LEDs via the switch network.

19. The system of claim 18, wherein the switch network is a matrix manager.

20. The system of claim 18, wherein the set of LEDs is configured to operate as a wiping turn indicator.

21. The system of claim 13,
wherein the identifier in the received message comprises a common identifier, and
wherein in response to determining the identifier is a common identifier:
the first circuit is configured to change the first set of LEDs to a specified level defined by the common identifier, and
the second circuit is configured to change the second set of LEDs to the specified level defined by the common identifier.

22. A method comprising:
receiving, by a circuit, a message from a bus controller via a communication bus;
determining, by the circuit, whether the message includes a function identifier that matches a specified function performed by the circuit;
in response to determining that the message includes the function identifier that matches the specified function performed by the circuit, driving, by the circuit, a set of LEDs based on:
instructions included in the message from the bus controller; and
a configuration of the circuit stored at a configuration memory of the circuit.

23. The method of claim 22, wherein the message comprises a lighting function activation flag and a LED brightness level.

* * * * *